W. Gardner.

Enameling Picture Frames.

No. 720. Reissued May 17, 1859.

Witnesses:
John S Millard
L. A. Langley

Inventor:
William Gardner

AM. PHOTO-LITHO. CO. N.Y. (OSBORNE'S PROCESS)

UNITED STATES PATENT OFFICE.

WILLIAM GARDNER, OF NEW YORK, N. Y.

IMPROVEMENT IN MACHINERY FOR PREPARING OVAL PICTURE-FRAMES.

Specification forming part of Letters Patent No. 21,192, dated August 17, 1858; Reissue No. 627, dated March 15, 1859; Reissue No. 720, dated May 17, 1859.

*To all whom it may concern:*

Be it known that I, WILLIAM GARDNER, of the city, county, and State of New York, have invented a new and useful Improvement in Machinery for Preparing Oval Picture-Frames; and I do hereby declare the following to be a full, clear, and exact description of the same, reference being had to the accompanying drawings, and to the letters of reference marked thereon.

My invention relates to machinery for laying on wooden or other bodies of oval picture-frames the coats of cement necessary for forming the groundwork for the gilding; and it consists in combining a scraper adapted to the form of the molding to be prepared, with the revolving face-plate of a lathe, the said scraper being so arranged as to adjust itself laterally, and thus accommodate itself to any irregularity in the movement of the frame, thereby imparting to the latter an accurate and smooth surface with a rapidity which cannot be attained by hand labor.

In order to enable others to make and use my invention I will now proceed to describe its construction and operation.

Figure 1:
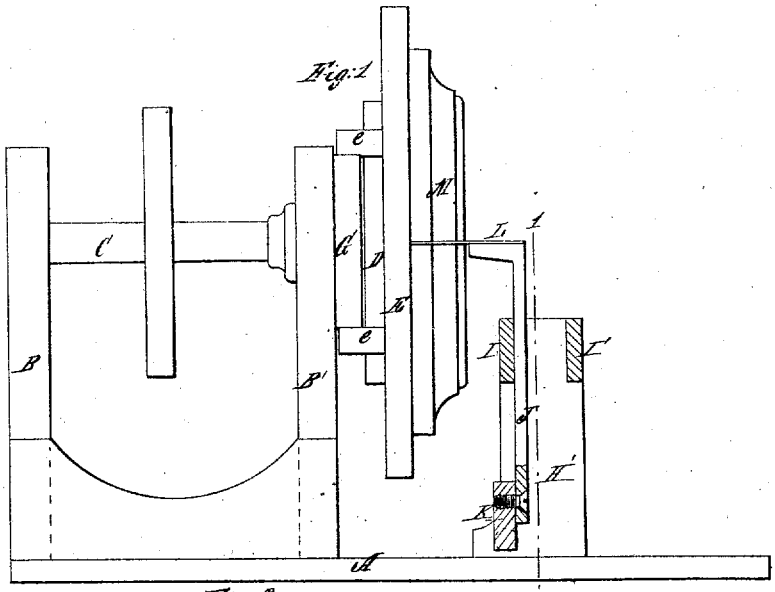
Figure 2:
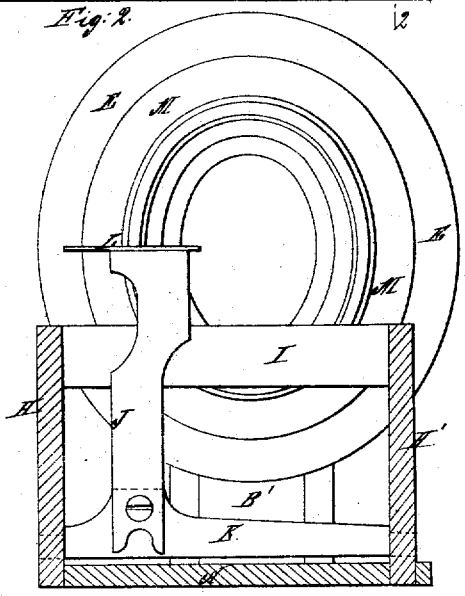
Figure 3:
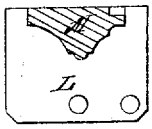

On reference to the accompanying drawings, which form a part of this specification, Figure 1 is a view, partially in section, of my machine for preparing oval picture-frames; Fig. 2, a transverse section on the line 1 2, Fig. 1; Fig. 3, a plan view of the self-adjusting scraper.

A is the base of the machine, to which are secured the two uprights B and B′ for the spindle C. E is the face-plate, having at the back permanent projections *e e*, which are arranged to fit over and slide freely on the bar D. Between the projections *e e*, and secured to the face of the upright B′, is a disk, G, situated eccentrically with the center of the spindle C.

As the parts above described have been heretofore used in connection with lathes for turning oval objects, and as they are not indispensable in the present instance, a further description of their construction and operation will be unnecessary.

In front of the face-plate, and at a suitable distance from the same, are erected the two uprights H and H′, which are connected together at the top by the transverse bars I and I′. Between the latter is situated the arm J, which is jointed at the bottom to the rock-shaft K, the ends of which are allowed to turn freely in the opposite uprights H and H′. The top of the arm J is furnished with a thin metal plate, L, one edge of which is so cut out as to coincide with the form of the molding of the frame M, the latter being attached to the face-plate.

The term "preparing," as applied to picture-frames by those engaged in their manufacture, signifies the covering of the wooden body of the frame with a preparation of whiting and glue, which forms the groundwork for the gilding, and it is necessary that this groundwork should be as smooth, and uniform as possible.

The preparation of oval picture-frames has hitherto been a tedious process of manipulation, and has usually been accomplished by laying the wooden body on a table and applying the mixture while in a semi-fluid state by means of a brush. When one coat has been laid on, it is allowed to dry, when a second coating is applied and this allowed to dry, the operation being repeated until the desired thickness of preparation has been deposited on the frame. The surface is then rubbed down by means of pumice-stone, the pieces of stone being adapted to the form of the different members of the molding. When the frame is thoroughly dried, it is ready to receive the gilding. It will be readily seen that this operation is one of so tedious a nature as to render oval picture-frames costly articles of ornament. It is a difficult matter when preparing oval picture frames by hand to make the moldings of any two frames exactly alike and uniform.

By my improvement the preparation of oval frames may be accomplished with great rapidity, as it is only necessary to attach the frame temporarily to the face-plate of the lathe, lay on the preparation when the frame is in motion, and to apply the scraper L. When one coat has been thus laid on, the frame may be removed and another operated on in a similar manner. When dry, the operation may be repeated until the required thickness of preparation is deposited on the frame and the desired smoothness and uniformity of surface attained. After several removals of the oval frames from the face plate it is almost impossible to place them in their proper positions in order that they may revolve with accuracy. This difficulty is obviated by my improvement, for even should the frame be attached to the face-plate considerably out of truth with the latter, the scraper I must accommodate itself to the irregularity of the movement, inasmuch as the arm J, to which the scraper is attached, is so jointed to the rock-shaft K that it can move freely backward and forward laterally with the frame, and as the rock-shaft is allowed to turn freely in the uprights the scraper can as easily be moved from and toward the molding of the frame, and this movement may be effected either by the hand of the attendant or by any suitable arrangement of springs.

Although I have illustrated and described the face-plate as arranged to traverse in an oval path, and although I prefer it to traverse in a path corresponding to the oval of the frame, it is not absolutely necessary that such should be the case, for even should the face-plate traverse in a circular path the scraper will adjust itself to the frame.

In preparing that class of oval frames which approximate to a true circle a circular movement of the face-plate will be almost as efficient as an oval movement.

Without confining myself, therefore, to a lathe with a face-plate traversing in an oval path, I claim and desire to secure by Letters Patent—

The combination of a scraper adapted to the form of the molding with the revolving face-plate of a lathe when the said scraper is arranged to be self-adjusting laterally to the said molding, for the purpose herein set forth.

In testimony whereof I have signed my name to this specification in the presence of two subscribing witnesses.

WILLIAM GARDNER.

Witnesses:

PETER S. HULL,
MOSES GARDNER.